Oct. 9, 1928.                           1,686,532
A. G. RONNING ET AL
POWER TRANSMISSION
Filed Aug. 20, 1923          2 Sheets-Sheet 1
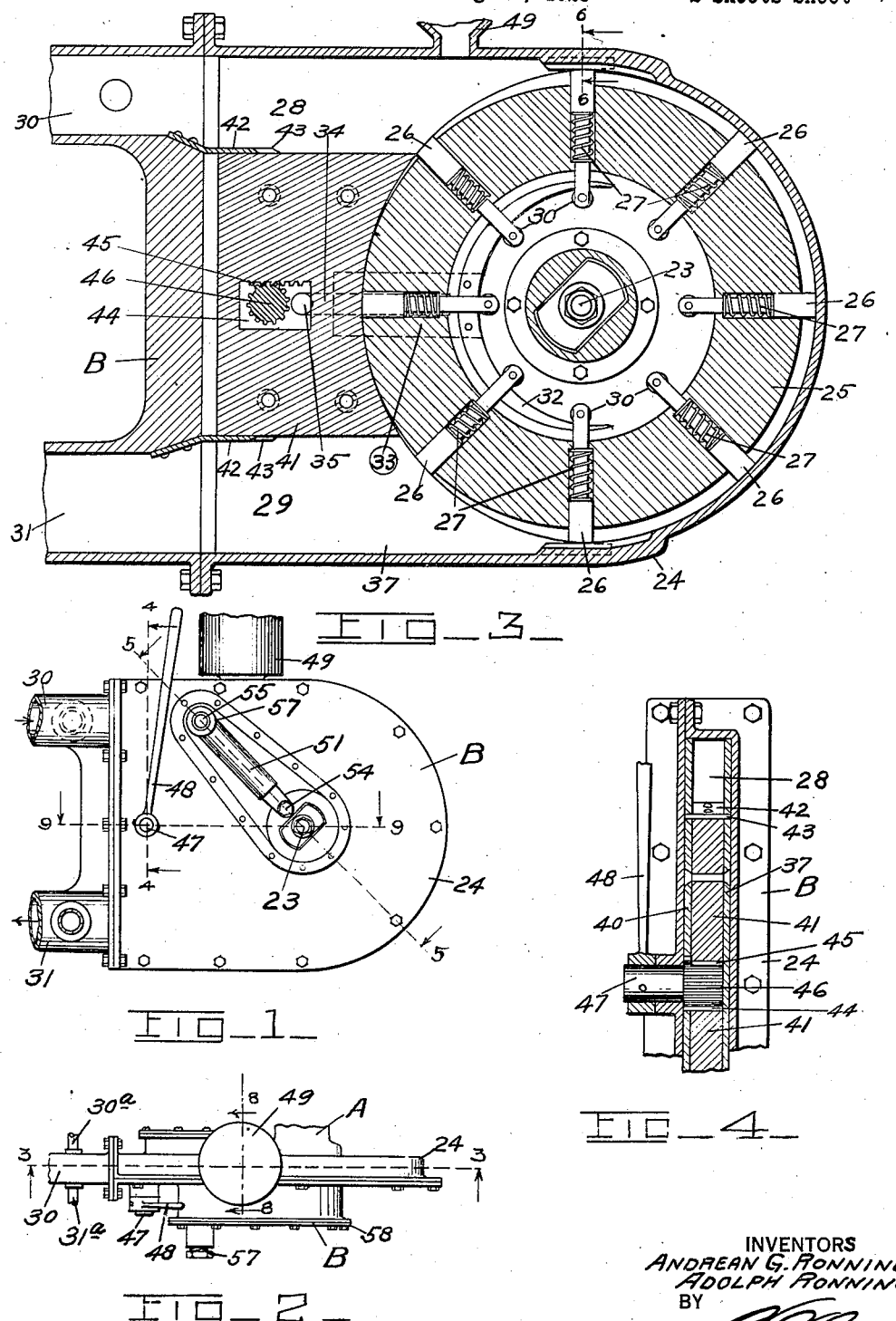
INVENTORS
ANDREAN G. RONNING
ADOLPH RONNING
BY
ATTORNEY Oct. 9, 1928.
A. G. RONNING ET AL
1,686,532
POWER TRANSMISSION
Filed Aug. 20, 1923      2 Sheets-Sheet 2
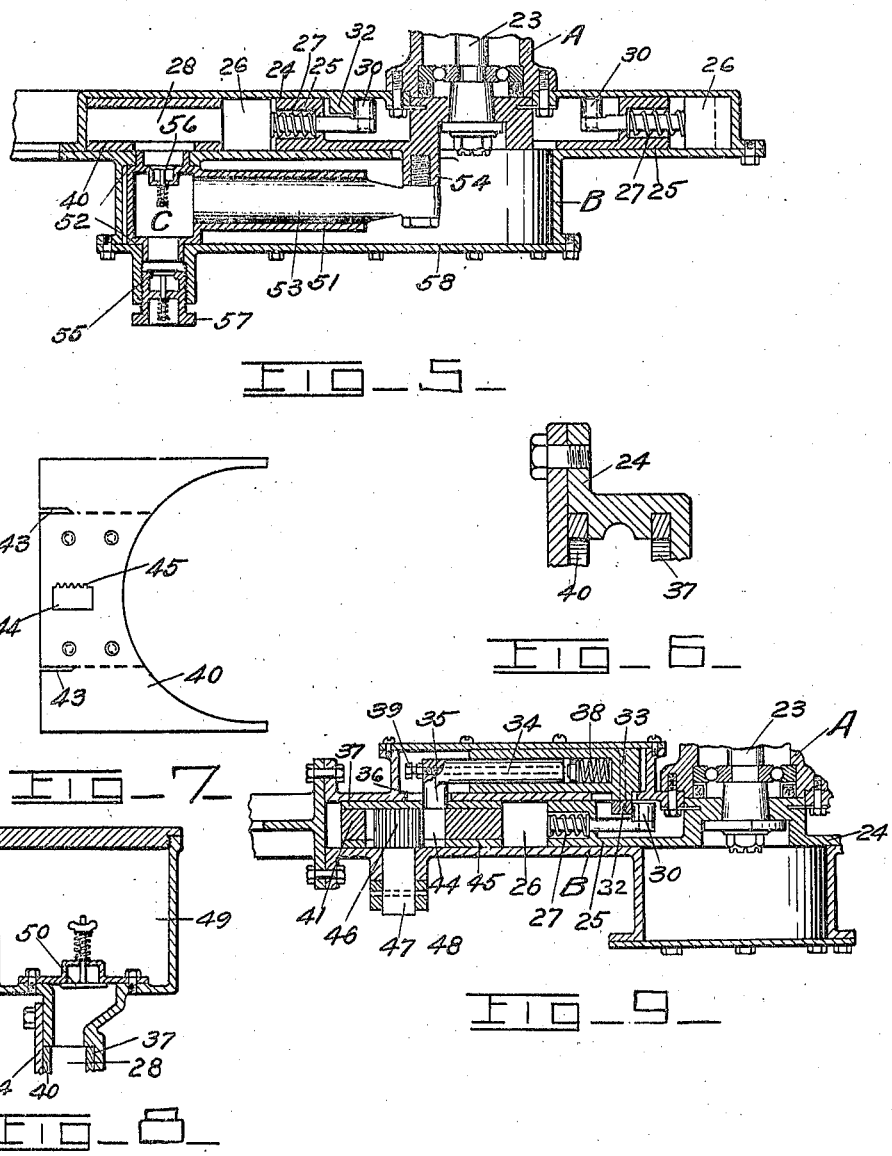
INVENTORS
ANDREAN G. RONNING
ADOLPH RONNING
BY
ATTORNEY Patented Oct. 9, 1928.

1,686,532

UNITED STATES PATENT OFFICE.

ANDREAN G. RONNING AND ADOLPH RONNING, OF MINNEAPOLIS, MINNESOTA; JACOB A. RONNING AND ADOLPH RONNING EXECUTORS OF SAID ANDREAN G. RONNING, DECEASED.

POWER TRANSMISSION.

Application filed August 20, 1923. Serial No. 658,363.

This invention has reference to power apparatuses and the principal object is to provide a practical, efficient and highly novel construction of power transmitting means, which is particularly designed for general use on and about farms or other places where portable power devices are required. Another and more specific object is to provide a conduit system, through which a fluid such as oil, water, air or gas may be driven and circulated by a pump at one end of the system, and in turn is adapted, by reason of its circulation, to drive a motor or other similar turbine unit, at the other end of the system, so that the power thus transmitted from the pump may be readily converted to various useful purposes at a remote distance from the pump and the machine or engine driving it. Further objects will be disclosed and described in the course of the following specification, the invention being illustrated in the structure shown in the accompanying drawings, in which:

Fig. 1 is an elevation of the pump or fluid circulating device.

Fig. 2 is a top view of the device as shown in Fig. 1.

Fig. 3 is an enlarged sectional elevation on the line 3—3 in Fig. 2.

Fig. 4 is an enlarged detail sectional view on the line 4—4 in Fig. 1.

Fig. 5 is an enlarged sectional view on the line 5—5 in Fig. 1, showing a slight modification.

Fig. 6 is an enlarged sectional detail view on the line 6—6 in Fig. 3.

Fig. 7 is a plan view of one of the plates used in the circulating device.

Fig. 8 is an enlarged detail section on the line 8—8 in Fig. 2.

Fig. 9 is an enlarged sectional view on the line 9—9 in Fig. 1.

Referring to the drawings more particularly and by reference characters A designates a tractor or other suitable power unit, having a power shaft 23, extending therefrom, which drives a rotary pump or circulating apparatus B.

The circulating apparatus B consists primarily of a casing in which a novel construction of pump wheel is driven by the shaft 23, and is used for the purpose of circulating the fluid through the system, and it will now be set forth in detail.

A suitably constructed main housing 24 is arranged upon the tractor or other power unit A, and within it is rotatably arranged a rotor 25 having radially slidable vanes or pistons 26, which are normally retained in outwardly extended positions by suitable springs 27. The housing 24 is provided with an intake or suction chamber 28 and an outlet or compression chamber 29, which chambers are connected in a circuit system, including conduits 30 and 31, later to be detailed, and it is the primary object of the pump pistons 26 to actuate the fluid from the intake to the outlet chambers and thus effect the circulation through the system.

The pistons 26 are provided near their inner ends either with rollers 30, as indicated in Figs. 3, 5, and 9, which rollers are engaged by a crescent or substantially semi-elliptically shaped guide 32, arranged on one inner side of the housing 24, for the purpose of retracting the pistons in from their normally circular path during substantially one half of their course about the shaft 23.

Referring now to the structure shown particularly in Figs. 1, 2, 3, 4, 6, 7, and 9, it will be noted that the guide 32 is mounted upon a block 33 which is slidably arranged and retained in the housing 24. An angular bar 34 is slidably arranged in the block 33 and has a projecting end 35 extending through a slot 36 and engaging a plate 37. A compression spring 38 is interposed between the inner end of the bar 34 and the block 33 and tends to yieldingly spread the bar end 35 away from the guide 32. The tension of the spring can be regulated by a suitable adjusting device 39.

The plate 37 is slidably arranged, for a short longitudinal movement, upon one inner side of the housing 24, and is complemented by a similar plate 40 similarly arranged upon the opposite side of the housing. The plates 37 and 40 are secured to and spaced apart by a spacing block 41, which also serves to separate the chambers 28 and 29. The escape of fluid from one chamber to the other is further prevented by a pair of guards 42, secured within the housing, which frictionally clamp the block 41 and have their edge portions slidably engageable in notches 43 in the plates 37 and 40. The block 41 and the plate 40 are centrally provided with a transverse aperture 44 having rack teeth and is mounted upon a short shaft 47 which is journaled in the housing 24, and has an exterior actuating lever 48. The forward edges of the plates 37 and 40 and the block 41 are arcuately curved with a radius equal to the radius describing the inner surface of the housing against which the pistons 26 rotate, but is slightly eccentric therewith, but said first mentioned curve is concentric with the curve described by the inner edge of the guide 32, so that when the guide pulls the pistons in, as above mentioned, the outer ends of the pistons will follow the curve described by the members 37, 40 and 41. Now when the lever 48 is tilted, for instance away from the shaft 23, it will pull the block 41, and its side plates, away from the rotor 25, but the guide 32, by following with the block, will keep the outer ends of the pistons in engagement with the block, thus preventing an unobstructed passage of the fluid from one chamber to the other. But, it will further be readily understood that the pistons 26, instead of passing idly from the chamber 29 to the chamber 28, will, during such movement, carry with them a certain amount of the fluid, thus decreasing the total amount actually pumped into the compression chamber. It will thus be obvious that the amount of fluid pumped through the circuit can be readily adjusted and regulated without changing the speed of the rotor, and if the lever 48 is moved over until the space between the wheel and the block is equal to the space between the rotor and the housing then the amount of fluid transmitted to the compression chamber will be reduced to nothing and the circulation through the system will stop entirely.

In order to keep the system properly filled with fluid lost through leakage or wear it may be found desirable to arrange an auxiliary supply reservoir 49 in connection with the suction side of the housing and provide it with a check valve 50 to prevent any back flow of the fluid. For the same purpose, and especially when the fluid consists of air or gas, we deem it advisable to add an auxiliary pump, as shown in Figs. 1, 2, and 5. This pump consists of a cylinder 51, oscillatably mounted as at 52 and having a piston 53, actuated by a projecting portion 54 of the rotor, and is arranged to draw the fluid in through a valve 55 and force it through a valve 56 into the receiving chamber 28, the valve 56 also serving to check a back flow in the same manner as stated by the valve 50. The valve 55 is mounted in a nipple 57 (see Fig. 5) which is threaded into the plate 58, so that it can be moved in and out at will. By moving the nipple 57 in and out the volume or cubic capacity of the auxiliary piston chamber C will be changed and as such change will effect the suction and compression capacity of the piston 53, it will be seen that the pressure of the fluid within the system can be readily adjusted merely by turning the nipple 57 to the desired position.

It is understood that the circulating apparatus, described, may, under proper circumstances, be substituted for and used as the motor.

It is further understood that many variations in the construction and arrangement of the apparatus and elements, herein set forth, may be resorted to without departing from the spirit and scope of the following claims.

Having now therefore fully shown and described our invention what we claim to be new and desire to protect by Letters Patent is:

1. The combination in a device of the character described, of a housing having a semicircular inner end, a rotor permanently arranged concentric with respect to said housing end and having its periphery spaced therefrom, radially arranged pistons slidably mounted in the rotor, a spacing block slidably arranged within the housing and normally engaging the rotor, to divide the housing into two chambers communicating with the rotor at different points, means for adjusting the spacing block to and away from the rotor, and means operative by the movement of the spacing block to regulate and determine the radial sliding movement of the pistons in the rotor.

2. The combination with a housing, of a rotor rotatably mounted therein, and concentrically spaced from one end thereof, pistons slidably arranged in the rotor, and normally extended to said housing end, a spacing member normally in contact with the periphery of the rotor and radially adjustable with respect thereto and with respect to said housing end, and means actuated by the spacing member to retract the pistons when passing the spacing member.

In testimony whereof we affix our signatures.

ANDREAN G. RONNING.
ADOLPH RONNING.